Oct. 17, 1950     E. L. SMITH     2,526,165

COOLING RECEPTACLE

Filed June 21, 1947

INVENTOR

EULA LEE SMITH

BY

*Mason & Graham*

ATTORNEYS

Patented Oct. 17, 1950

2,526,165

UNITED STATES PATENT OFFICE 2,526,165

COOLING RECEPTACLE

Eula Lee Smith, Los Angeles, Calif.

Application June 21, 1947, Serial No. 756,211

1 Claim. (Cl. 62—1)

This invention relates generally to receptacles designed to embody means for cooling or maintaining cool the contents thereof.

It is an object of this invention to provide a novel construction for a receptacle which enables the receptacle to be pre-cooled and then used for cooling or maintaining cool any desired substance placed therein without diluting or contaminating the substance in any way. The construction permits of the receptacle being made in any desired shape, such as in the form of a drinking glass.

It is a particular object to provide a receptacle which contains a coolant liquid suitable for freezing at moderately low temperatures permanently sealed within the walls whereby the receptacle may be pre-cooled to freeze such liquid prior to use, as by placing the device in a refrigerator, to render the same ready for use, and whereby the device may be repeatedly used without emptying and replacing the coolant liquid.

It is also an object to provide a device of the type indicated constructed in a manner to minimize the possibility of breakage or fracture of the device as might result from expansion of the sealed in liquid during freezing.

It is a further object to provide a hollow-walled receptacle providing a plurality of compartments in each of which is sealed a liquid, such as water, forming a coolant jacket substantially surrounding the chamber in which the contents of the receptacle are placed.

These and other objects will be apparent from the drawing and the following description thereof. Referring to the drawing, which is for illustrative purposes only:

Figure 1:
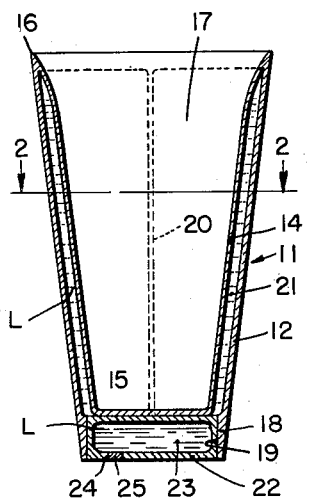
Fig. 1 is a sectional elevation of a device in the form of a drinking glass embodying the invention.
Figure 2:
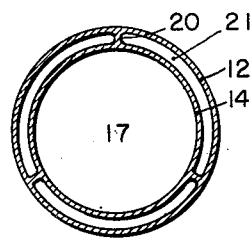
Fig. 2 is a section on line 2—2 of Fig. 1.

More particularly describing the invention, referring to Figs. 1 and 2, reference numeral 11 generally indicates a receptacle which, generally, is in the form of the ordinary drinking glass. The device comprises an outer wall 12 and spaced from it an inner wall 14, the inner wall terminating in a bottom wall section 15. The walls 12 and 14 are united at their upper ends, forming a rim 16. Below this the inner wall defines a central chamber 17 for the reception of any desired contents to be held by the glass. The outer wall extends below the bottom wall section 15 of the inner wall to form a base portion 18 having a cylindrical inner wall surface 19.

Intermediate the walls 12 and 14 there are provided any suitable number of longitudinally extending partition walls, such as the three walls 20, which divide the space between the walls into a plurality of coolant compartments 21 which together form a jacket about the chamber 17. The compartments 21 are substantially filled with water or some suitable liquid which can be frozen at a moderately low temperature, such as a temperature readily obtainable by a household refrigerator. In order to seal these compartments and to provide another compartment or coolant chamber below the chamber 17, a hollow plug 22 is provided. This plug may be formed of the same material as the remainder of the receptacle and may be made to fit within the base portion 18 and sealed therein in any suitable manner. Normally this plug 22 will be sealed in place after the compartments 21 have been filled with liquid.

The plug itself provides an additional coolant chamber 23 which may be substantially filled with the same liquid as contained within the compartments 21. This may be accomplished by initially providing an opening 24, closable by a small plug 25 sealed in place after the liquid is placed in the chamber 23. It is contemplated that the walls of the receptacle may be made of a variety of materials, such as a plastic, glass, metal or the like.

It is contemplated that the sealed in liquid, shown in the drawing and indicated by L, will substantially, but not quite, fill the various compartments in order to leave space for the expansion thereof during freezing. By utilizing the hollow plug at the bottom rather than continuing the compartments 21 down under the bottom inner wall section 15, I find that breakage resulting from expansion of the liquid on freezing is minimized. In this connection, it may be pointed out that where the coolant chamber or compartment makes an abrupt bend there is a tendency for the liquid in freezing to be confined at the bend with resulting fractures of the walls upon expansion of the freezing liquid.

In use, the device 11 is placed in a refrigerator or the like to freeze the liquid contained within the compartments 21 and the chamber 23. The compartmented construction, while not essential, insures a more even distribution of the liquid in the jacket should the receptacle be placed on its side than would otherwise be the case. The device may later be removed from the refrigerator and the chamber 17 filled with whatever liquid or substance is desired. The frozen liquid within the compartments 21 and chamber 23 will then serve to cool and/or maintain cool the contents of the receptacle without in any way diluting the same.

Figure 3:
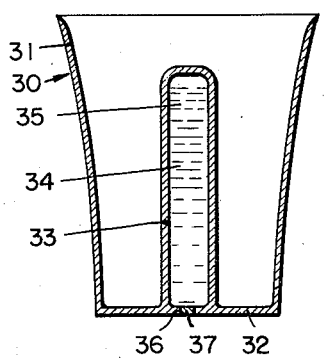
Fig. 3 is a sectional elevation of a modified form of the invention.

In Fig. 3 there is shown another form of the device wherein reference numeral 30 generally indicates a drinking receptacle comprised of the wall 31 and bottom wall 32. Within the wall 31 is an upwardly extending tubular wall 33 defining a closed coolant chamber 34, which may be substantially filled with a coolant liquid 35. The filling may be done through an opening 36 in the bottom wall which is closed by a small plug 37 which is sealed in place and becomes an integral part of the device. This device is used in the same manner as the device previously described.

Figure 4:
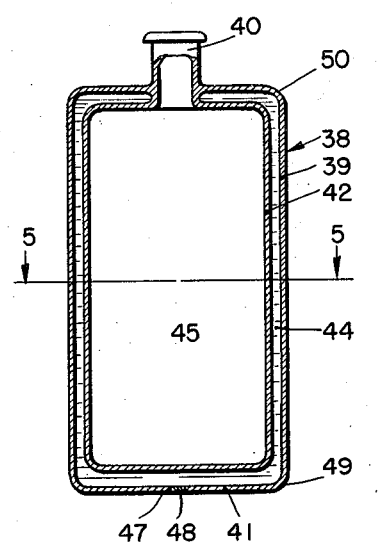
Fig. 4 is a sectional elevation of a bottle embodying a modified form of the invention.
Figure 5:
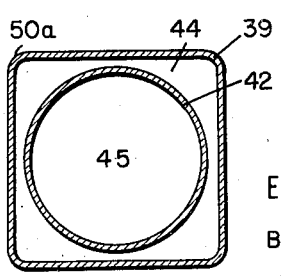
Fig. 5 is a cross section on line 5—5 of Fig. 4.

Referring to Figs. 4 and 5, there is shown another form of the invention wherein reference numeral 38 generally indicates a bottle or flask. The bottle has an outer wall 39 which is shown as substantially square in cross section. The wall terminates at its upper end in a neck 40 and at its lower end forms a bottom 41. Spaced inwardly from the wall 39 is a circular or cylindrical inner wall 42 which cooperates with the outer wall to define a coolant chamber or jacket 44 surrounding the chamber 45 which is designed to hold whatever contents may be placed within the bottle. The wall 42 becomes integral with the outer wall at the neck. The bottom wall 41 may be provided with an opening 47 for filling the jacket 44 with a suitable liquid of the type hereinabove indicated, and subsequently the opening may be closed by a plug 48 which is sealed in place and becomes an integral part of the device. To minimize possibility of breakage, I prefer to so form the walls as to have a rounded bend at the regions 49 and at the corners 50a.

By utilizing a cylindrical inner wall within a square outer wall it is possible to provide a coolant jacket of relatively large capacity as compared to the construction previously described where both walls are circular in cross section while at the same time it will be apparent that the storage space required for a set of the containers of the same content capacity is no greater.

Figure 6:
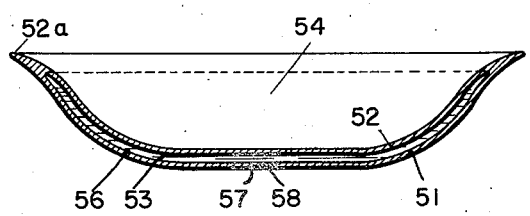
Fig. 6 is a sectional elevation of a bowl embodying the invention.

In Fig. 6 a bowl or dish is shown which comprises an outer wall 51 and an inner wall 52 spaced therefrom, the walls being joined at their upper ends to form a lip or rim 52a. This construction provides a coolant chamber or jacket 53 which is immediately adjacent to or surrounds the major portion of the main or contents chamber indicated by 54. The chamber 53 is substantially filled with a liquid 56 of the type indicated heretofore through the suitable opening 57 which is subsequently closed by the plug 58.

It is contemplated that various changes and modifications can be made in the constructions shown and described without departing from the scope of the invention as defined in the claim. For example, the drinking glass of Figs. 1 and 2 might be formed with a rectangular or square outer wall similar to the bottle of Figs. 4 and 5, and the bottle might be formed of inner and outer walls both of which are circular in cross section. It is also contemplated that the container of Fig. 3 might have an additional coolant chamber located below the bottom wall 32 similar to the one shown in Fig. 1.

I claim:

A cooling receptacle comprising continuous wall means defining the sides and end of a chamber open at one end for the reception of desired contents, additional wall means joined to the portion of said first-mentioned wall means at the closed end of the chamber defining a permanently fully enclosed coolant chamber extending longitudinally of and within said first-mentioned chamber, and a quantity of coolant liquid sealed in said coolant chamber substantially but not completely filling the same.

EULA LEE SMITH.

REFERENCES CITED

The following references are of record in the file of this patent:

UNITED STATES PATENTS

| Number | Name | Date |
| --- | --- | --- |
| 662,541 | Miskolczy | Nov. 27, 1900 |
| 1,771,186 | Mock | July 22, 1930 |
| 2,039,736 | Munters et al. | May 5, 1936 |
| 2,187,558 | Kushima | Jan. 16, 1940 |
| 2,288,044 | Stemme | June 10, 1942 |